United States Patent

Cunkelman et al.

[11] Patent Number: 5,963,883
[45] Date of Patent: Oct. 5, 1999

[54] MODIFIED AIRFLOW ALGORITHM WITH COMPENSATION FOR VARIATIONS IN MAIN RESERVOIR AIR PRESSURE AND AMBIENT AIRFLOW

[75] Inventors: Brian L. Cunkelman, Blairsville; James Varney, Rillton; Mike Wong, Plum Boro, all of Pa.

[73] Assignee: Westinghouse Air Brake Company, Wilmerding, Pa.

[21] Appl. No.: 08/831,576

[22] Filed: Apr. 9, 1997

[51] Int. Cl.⁶ .................................................. B60T 13/66
[52] U.S. Cl. ........................... 702/47; 702/50; 702/98; 702/100; 303/3; 303/15
[58] Field of Search .......................... 702/47, 45, 50, 702/51, 85, 98, 100, 104, 105, 113, 114, 116, 138, 189; 364/528.1, 528.16, 528.17, 528.36; 303/3, 15, 33; 73/861.42, 861.61, 861.32, 861.49, 861.48, 1.25, 1.34; 701/70, 71, 75–78, 81, 83; 137/8

[56] References Cited

U.S. PATENT DOCUMENTS

| | | | |
|---|---|---|---|
| 4,654,813 | 3/1987 | Edlund et al. | 73/861.48 |
| 4,859,000 | 8/1989 | Deno et al. | 303/33 |
| 5,090,780 | 2/1992 | Powell | 303/15 |
| 5,331,995 | 7/1994 | Westfall et al. | 137/8 |
| 5,563,353 | 10/1996 | Ferri | 73/861.48 |
| 5,621,657 | 4/1997 | Ferri | 73/861.42 |

*Primary Examiner*—Hal Dodge Wachsman
*Attorney, Agent, or Firm*—James Ray & Associates

[57] ABSTRACT

Data processing system for calculating the flowrate of air from a pressurized reservoir to an air pressure communication line. A pressure sensor is connected to the reservoir to provide an analog signal indicating pressure, which is converted into a digital pressure signal. The system also has a sensor connected to pressure ports upstream and downstream of an orifice, located between the reservoir and the air pressure communication line. This provides an analog differential pressure signal which is converted into a digital differential pressure signal, which is processed to obtain a first digital flowrate signal. This is combined with the digital pressure signal to obtain a flowrate correction value, from which a revised flowrate value is obtained. This revised flowrate value may be sent to an operator of the system, to a control system, or to an alarm system.

20 Claims, 2 Drawing Sheets

MODIFIED AIRFLOW ALGORITHM WITH COMPENSATION FOR VARIATIONS IN MAIN RESERVOIR AIR PRESSURE AND AMBIENT AIRFLOW

CROSS-REFERENCE TO RELATED APPLICATIONS

The invention taught in this patent application is closely related to the following U.S. Pat. No. 5,563,353. This patent is entitled "Software Nullification of Transducer Induced Offset Errors Within a Flow Rate Measurement System". It is also related to the following U.S. Pat. No. 5,621,657. This Patent is entitled "Automatic detection of Air Flow Transducer Type Under Software Control". The present application is also related to the following co-pending patent application: "Equalizing Reservoir Compensation". This co-pending application Ser. No. 08/826,897, was filed on the same date as the present application. Further, the teachings of the above mentioned Patents and application are incorporated herein by reference thereto. The Patent and application cited above have been assigned to the assignee of the present invention.

FIELD OF THE INVENTION

The present invention relates, in general, to airflow measurements and, more particularly, the instant invention relates to measurement of airflow from a main reservoir of a locomotive to the brakeline of the locomotive.

BACKGROUND OF THE INVENTION

As is generally well known in the art of controlling machinery, fluid filled conduits for control of machinery have been in widespread use for more than a century. Railroad braking systems based on a compressed air line as developed from the classical Westinghouse airbrake system are an example. Other examples may be found in the control of highway vehicles, submarines, aircraft, etc. The Westinghouse airbrake is a particularly interesting example, since it has a fail-safe feature in that failure of the brake air line resulting in a loss of brake line pressure causes application of brakes throughout the entire train.

Generally these systems have some amount of time delay between the initiation of a control signal and the actuation of the device being controlled. These delays can be quite significant for large systems. In particular, in a railway braking system, the time needed for a pressure decrement to travel along the length of a brake air line from a locomotive to a remote part of the train consist may be as long as a minute or longer.

More rapid methods of signal transmission, for example, by electrical wires, electromagnetic signals, or optical transmission, are known.

For railroad braking systems, the classical brake air line may be combined with radio transmission, particularly in a train having locomotives distributed at various locations along the train.

The WABCO Epic ® brake system combined with a radio communication link from Harris Locotrol® provides a system in which a brake application signalled by the lead locomotive of a train is accompanied by a radio signal sent from the lead locomotive to slave locomotives in portions of the train remote from the lead locomotive. As usual, with railroad airbrake systems, the lead locomotive dumps brakeline air, which sends a pressure decrement down the line of cars, causing a brake application as it proceeds. The radio signal is immediately received in locomotives remote from the lead locomotive, and these also begin venting brakeline air. Brakeline pressure decrements then begin to travel along the succession of railroad vehicles from each slave locomotive, causing the brakes to be applied as the pressure decrement reaches each vehicle.

Operation of this system requires, in each locomotive which supplies air to the brakeline, a measurement of the flowrate of air from a main air reservoir in the locomotive to the brakeline of the locomotive. The air pressure in the main air reservoir is maintained by a compressor in the locomotive. This flowrate can be used for a number of purposes. One thing it is used for is to determine the leakage flowrate. This is the flowrate of air which leaks out of the brakeline anywhere in the train. This flowrate is also used when the train is being prepared for travel, or after a brake application. In both of these cases, the brakeline pressure must be brought up to the operating pressure value. By measuring the flowrate to the brakeline, the system can determine when the brakeline is charged. This occurs when the measured flow through the orifice is approximately equal to the leakage flowrate.

The flowrate of air is measured by an orifice, such as the air path constriction in the L19 flowblock, which is located between the main air reservoir, and the brakeline. A pressure is obtained either from a pressure tap in the reservoir, or at a pressure tap at a point in the air path upstream of the orifice, and another pressure is obtained at a pressure tap at a point in the air path downstream of the orifice. These pressures are then used to determine the flowrate through the orifice. The flowrate is calculated by a formula, discussed in detail hereinafter, which includes the square root of the pressure drop across the orifice. Two types of transducer configurations are commonly used. In one configuration, two pressure sensing transducers are used. One measures a pressure upstream of the orifice, and one measures a pressure downstream of the orifice. The values of these pressures are subtracted from each other to obtain the differential pressure.

A preferred and more accurate method is to use a differential pressure transducer, which directly measures the pressure differential across the orifice. This transducer, for example, may have a diaphragm which has a space on one side which is connected to a pressure port upstream of the orifice, and a space on the other side which is connected to a pressure port downstream of the orifice.

The formula used in the prior art, which is based on the square root of the pressure difference, has an accuracy in the range of 10%. For some of the older systems, this has been adequate, but for systems employing remote locomotives controlled by a radio link, this accuracy is not sufficient.

Another difficulty with the prior art systems is that in normal operations, when the brakes are not applied, and the brakepipe is fully charged, the brakeline continuously leaks air, and demands air from the main reservoir. Hence, the main reservoir loses pressure continuously through the orifice supplying the brakeline, and is resupplied with air by pulses of air originating in the compressor. A brake control valve placed downstream of the orifice, and upstream of the brakepipe, controls the pressure downstream of the valve. Because the flow necessary to supply the leakage of air from the brakeline remains substantially constant, the brake control valve compensates for changes in main reservoir pressure to maintain a constant flow through the orifice. The prior art equation, which calculates the flow as the square root of the differential pressure across the orifice then incorrectly indicates a change in the flow rate. This erroneous indication triggers alarms which are sensitive to changes in flow which would be caused by a sudden major leak in the brakepipe.

SUMMARY OF THE INVENTION

In one aspect, the present invention provides a data processing system for calculating a flowrate of air from a pressurized reservoir to an air pressure communication line. The system includes means connected to a pressure sensor connected to the reservoir for receiving into the data processing system a first analog signal which indicates the reservoir pressure. The system has means for converting the first analog signal to a first digital signal.

The system also has means connected to a differential pressure sensor for receiving into the data processing system a second analog signal which indicates the difference between the reservoir pressure and a pressure downstream of an orifice in a flowblock placed between the reservoir and the air pressure communication line. The pressure tap for the main reservoir pressure and the tap for the pressure upstream of the orifice may be the same tap.

The system also has means for converting the second analog signal to a second digital signal. It also has means for processing the second digital signal to obtain a third digital signal, which indicates a first flowrate value for flow through the orifice. This first flowrate value may be obtained from the same algorithm as that used in the prior art, in which the calculated flowrate is proportional to the square root of the pressure drop across the orifice. Means are provided for processing the first digital signal and the third digital signal to obtain a fourth digital signal which indicates a correction value for the first flowrate value.

The system also has means for generating a fifth signal which indicates a revised flowrate value. The fifth signal is based on a combination of the third digital signal which indicates the first flowrate value and the fourth digital signal which indicates the correction to the first flowrate value. The system also has means for communicating the fifth signal which indicates the revised flowrate value to either a display unit for display to a person, an input to a control system, or both.

In a second aspect, the invention provides a method for use in a data processing system for calculating the flowrate of air from a reservoir to an air pressure communication line. The method consists of receiving into the data processing system a first analog signal which indicates the pressure of air in the reservoir. This first analog signal is then converted into a first digital signal. The data processing system also receives a second analog signal which indicates the difference between the first pressure in the reservoir and a second pressure which is at a port downstream of an orifice placed between the reservoir and the air pressure communication line. The second analog signal is then converted to a second digital signal, which is processed to obtain a third digital signal, which is indicative of a first flowrate value for flow through the orifice. The first digital signal and the third digital signal are then processed to obtain a fourth digital signal which indicates a correction value for the first flowrate value. A fifth signal is then generated which indicates the revised flowrate value. The fifth signal is based on a combination of the third digital signal which indicates the first flowrate value and the fourth digital signal which indicates the correction to the first flowrate value. The fifth signal is then communicated to a display unit for a person, a control system, and/or to an alarm system.

OBJECTS OF THE INVENTION

It is, therefore, one of the primary objects of the present invention to provide a system for measuring a flowrate from a supply source in a locomotive, such as a main air reservoir, to a brakeline of the locomotive.

Another object of the present invention is to provide a measurement of a flowrate to a brakeline of a locomotive with an accuracy which is improved over the prior art.

Still another object of the present invention is to provide a more accurate measurement of leakage flowrate, which is obtained at a time when a brake application is not in effect, and at a time when the brakeline is fully charged.

Yet another object of the present invention is to provide a more accurate brakeline flow measurement to provide an improved determination of a time when the brakeline is charged, and the train can be put in motion.

Still another object of the present invention is to eliminate erroneous changes in indicated airflow which are due to pressure fluctuations in the reservoir which supplies the orifice, these changes in indicated airflow occurring in prior art systems even when there is no real change in airflow.

In addition to the various objects and advantages of the present invention which have been generally described above, there will be various other objects and advantages of the invention that will become more readily apparent to those persons who are skilled in the relevant art from the following more detailed description of such invention, particularly, when such detailed description is taken in conjunction with the attached drawing figure and with the appended claims.

Figure 1:
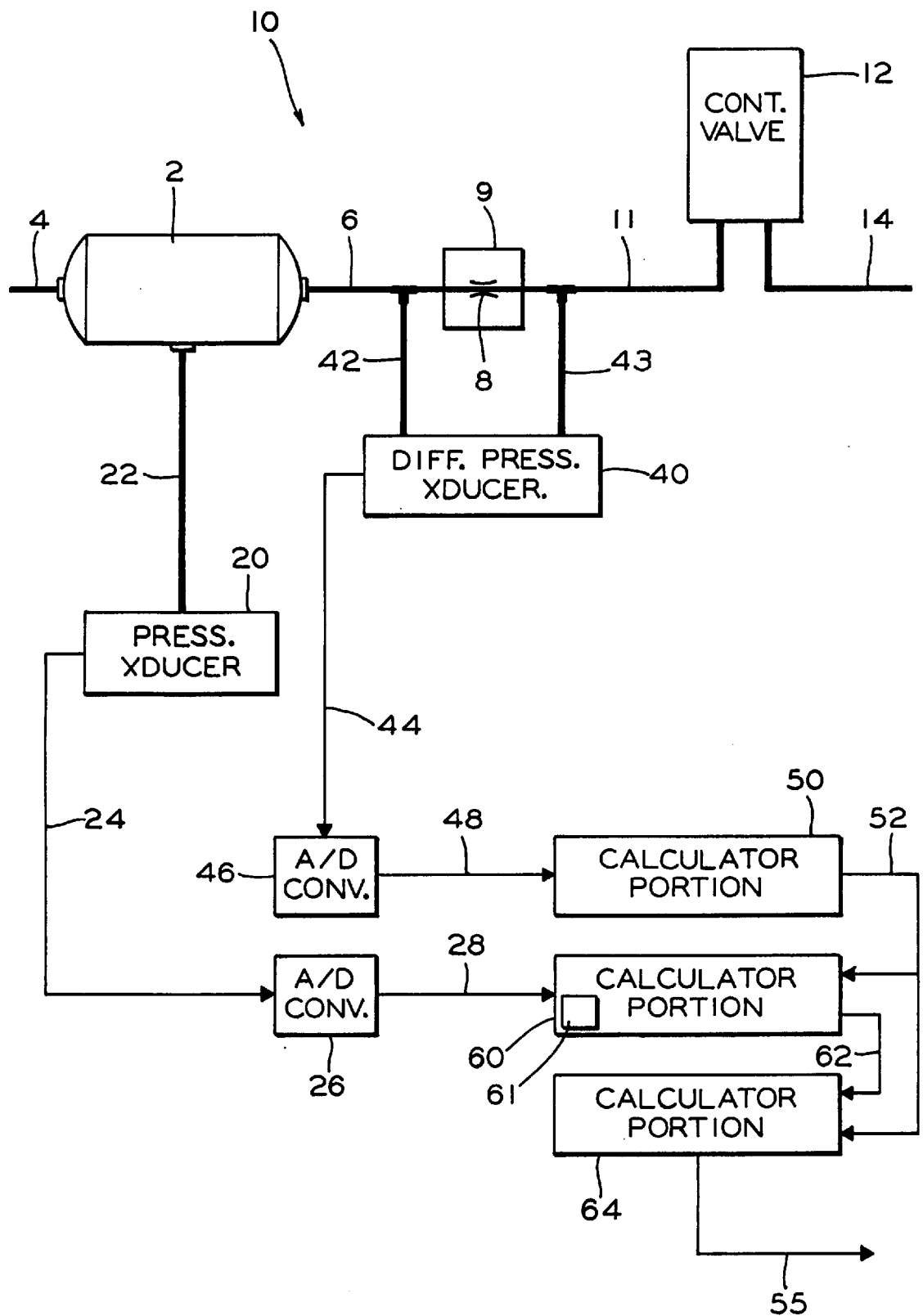
FIG. 1 is a schematic of the basic elements of the invention.

BRIEF DESCRIPTION OF THE PRESENTLY PREFERRED AND VARIOUS ALTERNATIVE EMBODIMENTS OF THE INVENTION

Reference is herein made to the figure, which shows the basic elements of the system. The system 10 has a main reservoir 2 which receives air from supply line 4, and supplies air to outlet line 6. Reservoir 2 has a pressure connection 22 connected to pressure transducer 20 which supplies an analog signal indicating the pressure of reservoir 2 through electrical connection 24. Outlet line 6 has an orifice 8 in flowblock 9 which impedes airflow to generate a differential pressure between upstream pressure connection 42 and downstream pressure connection 43. Pressure connections 42 and 43 supply air to differential pressure transducer 40, which supplies an analog signal on electrical connection 44 to an analog to digital converter 46. Analog to digital converter 46 supplies digital signal 48 to 50 for obtaining a first calculation of flow based on the pressure drop across orifice 8 in flowblock 9.

Electrical connection 24 carries an analog signal indicating the pressure in main reservoir 2 to an analog to digital converter 26. Analog to digital converter 26 provides digital signal 28, which represents the pressure of air in main reservoir 2.

Air from main reservoir 2, after passing through flowblock 9, passes through downstream pipe portion 11, brake control valve 12 and brakeline 14. Brake control valve 12 provides for maintaining pressure in brakeline 14 at a constant predetermined value. The engineer of the locomotive may set this value, a brake control computer may set this value, or it may be established in another locomotive and transmitted by radio or electrical wire means.

Means 50 provides a first calculation of flow through orifice 8 and generates signal 52 indicating the first flow calculation.

Signal 52 indicating first flow calculation from means 50 and signal 28 from analog to digital converter 26 are received into means 60, which calculates a correction to the flow based on a combination of signals 28 and 52, using the connection table shown below. Signal 62 which indicates the correction to the flow value is received in means 64, which also receives signal 52 indicating the first flow value. Means 64 combines signal 62 and signal 52 to obtain the final flow calculation represented by signal 55.

Signal 55 is the output of this invention. It may be used in a display for a human operator, as input to a control system, or as input to an alarm.

For the case in which flowblock 9 is an L19 flowblock, with an orifice diameter of $19/64$ inches, the first flow calculation which is calculated in 50 is the following: FLOW= 26.835* SQRT(DIFFERENTIAL PRESSURE). In this equation, DIFFERENTIAL PRESSURE is the pressure difference measured across orifice 8 by differential pressure transducer 40. It is measured in pounds per square inch. The value of the first flow calculation, FLOW, has the units of standard cubic feet per minute. SQRT refers to the square root function which provides a numerical value equal to the square root of the numerical value of DIFFERENTIAL PRESSURE.

For the case cited above, in which orifice 8 has a diameter of $19/64'$, the flow correction 62 is calculated from the correction table

CORRECTION TABLE

| | 100 psi | | | | | | | | | 150 psi |
|---|---|---|---|---|---|---|---|---|---|---|
| 20 cfm | 0 | 0 | 0 | 0 | 0 | 0 | 0 | 0 | 0 | 0 |
| | 9 | 8 | 6 | 5 | 3 | 2 | 0 | -2 | -3 | -5 | -6 |
| | 12 | 10 | 8 | 6 | 4 | 2 | 0 | -2 | -4 | -6 | -8 |
| | 15 | 13 | 10 | 8 | 5 | 3 | 0 | -3 | -5 | -8 | -10 |
| 60 cfm | 35 | 30 | 25 | 20 | 15 | 8 | 0 | -4 | -8 | -12 | -16 |

The table above represents flow correction 62. Pressures from signal 28 measured in pressure transducer 20 run left to right in the table, in the pressure range from 100 psi to 150 psi. The first calculation of the flowrate, 52 runs from the top row of the table where it has a value of 20 scfm to the bottom row of the table, where it has the value of 60 scfm. The correction value 62 is combined with the value of the first flow calculation, 52, by adding the correction value 62 to the first flow calculation 52. This addition is performed in means 64.

Figure 2:
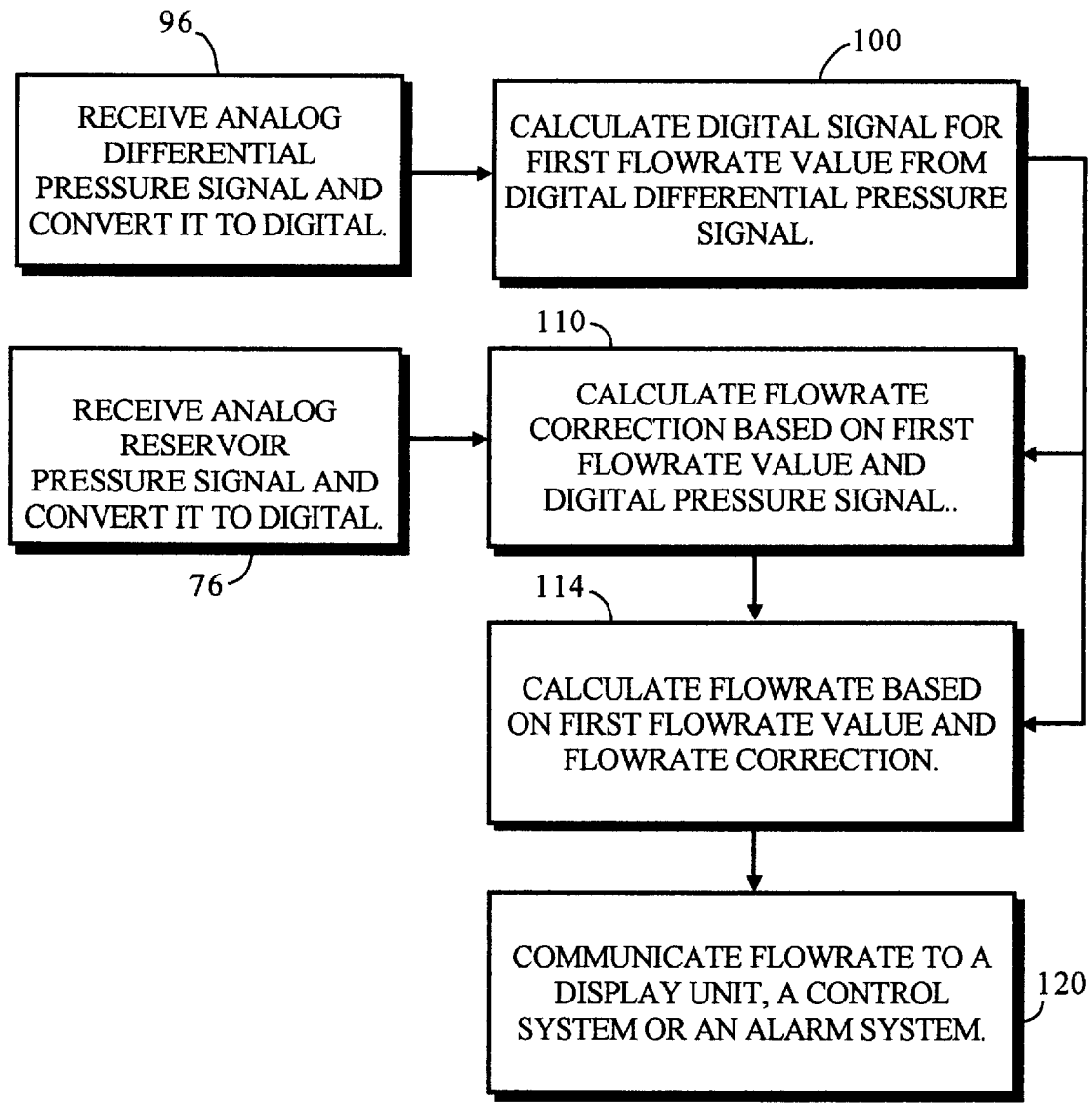
FIG. 2 is a flowchart of the process of the invention.

Reference is now made to FIG. 2, which is a flowchart of the process of the invention. An analog differential pressure signal (which is signal 44 from differential pressure transducer 40 in FIG. 1) is received and converted in step 96 into a digital differential pressure signal 48. In step 100, digital differential pressure signal 48 is converted into a digital signal 52 (FIG. 1) which represents a first flowrate value.

An analog pressure signal 24 from pressure transducer 20 (FIG. 1) is received and converted in step 76 to a digital pressure signal 28. In step 110, the digital signal 52 representing a first flowrate value and digital pressure signal 28 are combined using the correction table, which is shown as 61 in FIG. 1, to obtain a digital signal 62 representing a flowrate correction. In step 114, a second flowrate value 55 is obtained by combining first flowrate value 52 and flowrate correction 62. In step 120, the second flowrate value is communicated to a display unit, a control system, or an alarm system.

In a broader aspect, the present invention provides a data processing system for calculating a flowrate of air from a pressurized reservoir to an air pressure communication line. The system includes means connected to a pressure sensor connected to the reservoir for receiving into the data processing system a first analog signal which indicates the reservoir pressure. The system has means for converting the first analog signal to a first digital signal.

The system also has means connected to a differential pressure sensor for receiving into the data processing system a second analog signal which indicates the difference between the reservoir pressure and a pressure downstream of an orifice in a flowblock placed between the reservoir and the air pressure communication line. A pressure tap for the main reservoir pressure and a tap for the pressure upstream of the orifice may be the same tap, although they are shown different in the figure.

The system also has means for converting the second analog signal to a second digital signal. It also has means for processing the second digital signal to obtain a third digital signal, which indicates a first flowrate value for flow through the orifice. This first flowrate value may be obtained from the same algorithm as that used in the prior art.

Means are provided for processing the first digital signal and the third digital signal to obtain a fourth digital signal which indicates a correction value for the first flowrate value. These means may employ a matrix of stored correction signals, the coefficients of which are selected in accordance with the first digital signal and the third digital signal.

The system also has means for generating a fifth signal which indicates a revised flowrate value. The fifth signal is based on a combination of the third digital signal which indicates the first flowrate value and the fourth digital signal which indicates the correction to the first flowrate value. This combination may be done by adding or subtracting values in the matrix to the third digital signal. The system also has means for communicating the fifth signal which indicates the revised flowrate value to either a display unit for display to a person, an input to a control system, or both.

The matrix cited above for correction of flowrate value may have an extreme value for a case in which the flowrate value is high and air pressure in the reservoir is low. It may also have another extreme value for a case in which the flowrate value is high and the air pressure in the reservoir is high. The polarity of this extreme value is opposite to the polarity of the first extreme value. For example, the first extreme value may be positive, and the second extreme value may be negative.

The matrix may also have lower variations in flowrate correction when the first flowrate value is low, as compared with flowrate corrections for the case of high flowrate values.

The reservoir cited above may be a main air reservoir of a locomotive, and the air pressure communication line may be a brakepipe of the locomotive. The orifice cited above may be in a flowblock, such as the L19 flowblock. The data processing system may use portions of the EPIC® brake control system. The calculation of the first flowrate value may, for example, be done by multiplying a constant by the square root of the differential pressure across the orifice.

In an additional aspect, the invention provides a method for use in a data processing system for calculating the flowrate of air from a reservoir to an air pressure communication line. The method consists of receiving into the data processing system a first analog signal which indicates the pressure of air in the reservoir. This first analog signal is then converted into a first digital signal. The data processing system also receives a second analog signal which indicates the difference between the first pressure in the reservoir and a second pressure which is at a port downstream of an orifice placed between the reservoir and the air pressure communication line. The second analog signal is then converted to a second digital signal, which is processed to obtain a third digital signal, which is indicative of a first flowrate value for flow through the orifice. The first digital signal and the third digital signal are then processed to obtain a fourth digital signal which indicates a correction value for the first flowrate value. A fifth signal is then generated which indicates the revised flowrate value. The fifth signal is based on a combination of the third digital signal which indicates the first flowrate value and the fourth digital signal which indicates the correction to the first flowrate value. The fifth signal is then communicated to a display unit for a person, a control system, and/or to an alarm system.

While a presently preferred and various additional alternative embodiments of the instant invention have been described in detail above in accordance the patent statutes, it should be recognized that various other modifications and adaptations of the invention may be made by those persons who are skilled in the relevant art without departing from either the spirit or the scope of the appended claims.

We claim:

1. A data processing system for calculating a flowrate of air from a reservoir having a first pressure to an air pressure communication line, said data processing system comprising:

(a) means connected to a pressure sensor having air pressure connection to said reservoir for receiving into said data processing system a first analog signal indicative of said first pressure of air in said reservoir;

(b) means for converting said first analog signal to a first digital signal;

(c) means connected to a differential pressure sensor for receiving into said data processing system a second analog signal indicative of a difference between said first pressure in said reservoir and a second pressure, said difference measured across an orifice disposed between said reservoir and said air pressure communication line;

(d) means for converting said second analog signal to a second digital signal;

(e) means for processing said second digital signal to obtain a third digital signal, said third digital signal indicative of a first flowrate value for flow through said orifice;

(f) means for processing said first digital signal and said third digital signal to obtain a fourth digital signal indicative of a correction value for said first flowrate value, said means for processing said first digital signal and said third digital signal including a stored set of correction signals representing a table of correction values for said first flowrate value, said correction values depending on said first digital signal and said third digital signal, said table being further characterized in that said correction value has a first extreme value for a case in which said first flowrate value is relatively high, and in which said first pressure of air in said reservoir is relatively low, said first extreme value having a first polarity;

(g) means for generating a fifth signal indicative of a second flowrate value, said fifth signal based on a combination of said third digital signal indicative of said first flowrate value and said fourth digital signal indicative of said correction value to said first flowrate value; and (h) means for communicating said fifth signal indicative of said second flowrate value to at least one of a display unit for display to a person, an input to a control system, and an input to an alarm system.

2. A data processing system according to claim 1 having means for combining said third digital signal indicative of said first flowrate value and said fourth digital signal indicative of said correction value by addition.

3. A data processing system according to claim 1 wherein said table is further characterized in that said correction value has a second extreme value for a case in which said first flowrate value is relatively high, and in which said first pressure of air in said reservoir is relatively high, said second extreme value having a polarity opposite to said first polarity of said first extreme value.

4. A data processing system according to claim 3 wherein for cases in which said first flowrate value is relatively low, said table values have a smaller range than a difference between said first extreme value and said second extreme value.

5. A data processing system according to claim 1 wherein values in said table are further characterized in that changes in table value for adjacent values of said reservoir pressure have a greater absolute magnitude for a first portion of said table corresponding to relatively high values of said first flowrate value than for a second portion of said table corresponding to relatively low values of said first flowrate value.

6. A data processing system according to claim 1 wherein said reservoir is a main reservoir of a locomotive.

7. A data processing system according to claim 6 wherein said air pressure communication line is a brakepipe of said locomotive.

8. A data processing system according to claim 6 which is further characterized as being a brake control computer of said locomotive.

9. A data processing system according to claim 1 wherein said means for processing said second digital signal to obtain said third digital signal calculates said third digital signal as a constant multiplied by a square root of said second digital signal.

10. A data processing system according to claim 1 having means for combining said third digital signal indicative of said first flowrate value and said fourth digital signal indicative of said correction value by subtraction.

11. A method for use in a data processing system for calculating a flowrate of air from a reservoir having a first pressure to an air pressure communication line, said method comprising:

(a) receiving into said data processing system a first analog signal indicative of said first pressure of air in said reservoir;

(b) converting said first analog signal to a first digital signal;

(c) receiving into said data processing system a second analog signal indicative of a difference between said first pressure in said reservoir and a second pressure, said difference measured across an orifice disposed between said reservoir and said air pressure communication line;

(d) converting said second analog signal to a second digital signal;

(e) processing said second digital signal to obtain a third digital signal, said third digital signal indicative of a first flowrate value for flow through said orifice;

(f) processing said first digital signal and said third digital signal to obtain a fourth digital signal indicative of a correction value for said first flowrate value, said processing of said first digital signal and said third digital signal including looking up a correction value in a table represented by digital signals stored in said data processing system, said correction value depending on said first digital signal and said third digital signal, said table being further characterized in that said correction value has a first extreme value for a case in which said first flowrate value is relatively high and in which said first pressure of air in said reservoir is relatively low, said first extreme value having a first polarity;

(g) generating a fifth signal indicative of a second flowrate value, said fifth signal based on a combination of said third digital signal indicative of said first flowrate value and said fourth digital signal indicative of said correction to said first flowrate value; and (h) communicating said fifth signal indicative of said second flowrate value to at least one of a display unit for display to a person, an input to a control system, and an input to an alarm system.

12. A method according to claim 11 wherein step (g) is further characterized as combining said third digital signal indicative of said first flowrate value and said fourth digital signal indicative of said correction value by addition.

13. A method according to claim 11 wherein step (f) is further characterized in that said correction value has a second extreme value for a case in which said first flowrate value is relatively high, and in which said first pressure of air in said reservoir is relatively high, said second extreme value having a polarity opposite to said first polarity of said first extreme value.

14. A method according to claim 13 wherein for cases in which said first flowrate value is relatively low, said correction values have a smaller range than a difference between said first extreme value and said second extreme value.

15. A method according to claim 11 wherein values in said table are further characterized in that changes in correction values for adjacent values of said reservoir pressure have a greater absolute magnitude for a first portion of said table corresponding to relatively high values of said first flowrate value than for a second portion of said table corresponding to relatively low values of said first flowrate value.

16. A method according to claim 11 wherein said reservoir is a main reservoir of a locomotive.

17. A method according to claim 16 wherein said air pressure communication line is a brakepipe of said locomotive.

18. A method according to claim 16 wherein said data processing system is a brake control computer of said locomotive.

19. A method according to claim 11 wherein said step of processing said second digital signal to obtain a third digital signal is further characterized in that said third digital signal is calculated from a constant multiplied by a square root of said pressure difference indicated by said second digital signal.

20. A method according to claim 11 wherein step (g) is further characterized as combining said third digital signal indicative of said first flowrate value and said fourth digital signal indicative of said correction value by subtraction.

* * * * *